US005108524A

United States Patent [19]

Balderrama

[11] Patent Number: 5,108,524

[45] Date of Patent: Apr. 28, 1992

[54] METHOD OF APPLYING A MANUALLY OPERATED DISPENSER TO A CONTAINER USING A HOT MELT LINER MATERIAL

[75] Inventor: Mark A. Balderrama, Colton, Calif.

[73] Assignee: Calmar Inc., City of Industry, Calif.

[21] Appl. No.: 537,233

[22] Filed: Jun. 13, 1990

[51] Int. Cl.[5] .......... B29C 67/22

[52] U.S. Cl. .......... 156/69; 156/78; 264/46.4; 264/46.5

[58] Field of Search .......... 156/69, 78; 264/46.4, 264/46.5

[56] References Cited

U.S. PATENT DOCUMENTS

| | | | |
|---|---|---|---|
| 4,032,492 | 7/1977 | Englund et al. . | |
| 4,256,526 | 3/1981 | McDaniel | 156/78 |
| 4,295,573 | 10/1981 | Terry et al. | 427/230 |
| 4,592,690 | 6/1986 | Busch | 156/69 |
| 4,756,857 | 7/1988 | Dezio et al. . | |
| 4,781,773 | 11/1988 | Instance | 156/78 |
| 4,917,949 | 4/1990 | Yousif | 156/69 |
| 4,938,390 | 7/1990 | Markua | 156/69 |
| 4,961,796 | 10/1990 | Perrin et al. | 156/69 |
| 4,991,731 | 2/1991 | Osip et al. | 156/69 |

*Primary Examiner*—Robert A. Dawson
*Assistant Examiner*—Allan Kuhns
*Attorney, Agent, or Firm*—Watson, Cole, Grindle & Watson

[57] ABSTRACT

A hot melt gasket or liner is applied to a portion of a manually operated dispenser having a closure cap for coupling the dispenser to a container. The material may contain a predetermined amount of gaseous fluid to form a foamed hot melt material having a predetermined density. After the material cools to room temperature, it forms an anti-slip gasket seal which, upon coupling the cap to the container neck, the hot melt material is compressed for restricting movement of the dispenser about the central axis of the container and for preventing formation of a leak path between the container rim surface and the dispenser.

3 Claims, 2 Drawing Sheets

METHOD OF APPLYING A MANUALLY OPERATED DISPENSER TO A CONTAINER USING A HOT MELT LINER MATERIAL

BACKGROUND OF THE INVENTION

This invention relates generally to a technique for sealing the closure cap of a manually operated dispenser to a container, utilizing a liner of hot melt material.

Manually actuated dispensers, such as the fingertip actuated and the trigger actuated types, are mounted on the neck of a container utilizing a closure cap coupled to the dispenser. A separate liner or gasket of elastomeric material, such as polyethylene, isobutylene/-polyethylene or foamed polyethylene, is typically provided for sealing the package from leakage of product from the container along a path between the neck rim and the lower end of the dispenser. The liner is positioned between the neck rim and an annular surface at the lower end of the dispenser, and is press-fitted, snap-fitted or otherwise engaged with the dispenser at its lower end for retaining the gasket in place prior to assembly with the container.

The closure cap may be internally threaded for engagement with the external threads of the container neck. On tightening the closure, i.e., "torquing down", the tightened closure cap oftentimes has the tendency to back-off or loosen, especially during shipment and storage, thereby causing leakage of product from the container. For example, vibrations during shipment can cause the closure cap to loosen as the compressed gasket seal slips and relaxes. Likewise, should the dispenser body reorient itself on the container during shipment or packaging or handling prior to shipment, torque back-off has been experienced upon turning movement of the dispenser body about the central axis of the container in a loosening direction. Moreover, if the dispenser body is reoriented during use relative to the container by turning in a loosening direction, the closure cap tends to back-off, causing leakage.

Otherwise, the metallic closure cap may be swaged on to the container neck for coupling the cap to the container by deforming the cap during a swaging process. The separate gasket liner used oftentimes proves ineffective for its intended sealing purpose if the liner is too hard and/or if the cap is not carefully swaged in place.

The selection of different liners for their relative softness and hardness depending on the closure cap style, container size and use, product compatibility, dispenser size and style, etc., renders it difficult for the dispenser supplier to meet all the needs of its customers.

Moreover, during shipment and handling separate gaskets easily fall away from the dispenser package to which they are attached, are costly to manufacture and assemble, and present handling problems during assembly and storage.

Integral liners have been provided to avoid gasket fallout from the dispenser body. Such liners are molded as part of the body and of the same Plastic material, thereby limiting the integral liner to the choice of dispenser body material. A soft or tacky liner is therefore not made possible with this approach.

SUMMARY OF THE INVENTION

In accordance with the invention, a hot melt material is utilized as a gasket or liner which adheres to the lower end of the dispenser when applied in position to overlie the rim of the neck of a container to which a manually operated dispenser is mounted. The hot melt material is applied in a molten state, and the material may contain a predetermined amount of gaseous fluid, such as nitrogen, so as to form a foamed hot melt material having a predetermined density, compressibility and tackiness. The material is applied in the form of an annular bead in the molten state to a portion of the dispenser, and is allowed to cool to room temperature to form an anti-slip gasket seal.

Such portion of the dispenser may comprise a separate sleeve part having an annular surface for receiving the hot melt material. The sleeve is assembled to the dispenser, as by press fitting, and engages with the closure cap before the cap is coupled to the container neck.

Alternatively, such dispenser portion may form an end of the dispenser body having an annular surface for receiving the hot melt material, with the closure cap being snap-fitted to the dispenser body, and coupled to the container neck.

If the dispenser is intended to be removed from the container for refilling, a Predetermined amount of gaseous fluid will be injected into the hot melt material. If needs call for adherence of the dispenser body to the container, a minor amount of gaseous fluid, or none at all, will be injected into the hot melt material Upon mounting the closure cap to the container neck, the cooled hot melt material is compressed against the rim surface of the neck such that the hot melt material restricts unthreading of a threaded cap, and loosening of a swaged cap, while being adhered or unadhered to the rim surface, depending on the nitrogen gas injected, and prevents formation of a leak path between the rim surface and the dispenser.

The gaseous fluid, which may comprise nitrogen gas, is injected into the hot melt material under a predetermined pressure to maintain the fluid in solution until the annular bead is applied to the dispenser portion. In such manner, the gaseous fluid is trapped in the hot melt material as bubbles as the material cools.

The applied bead of hot melt material may be of sufficient quantity that upon thread-coupling the closure cap to the container, the hot melt material extrudes into contact with the threads of the cap to further restrict unthreading of the cap.

By controlling the density and compressibility of the hot melt material, depending on the amount, or none at all, of the nitrogen gas injected, a wide variety of end uses for applying a manually operated dispenser to a container are made Possible in accordance with the Present technique.

Other objects, advantages and novel features of the invention will become more apparent from the following detailed description when taken in conjunction with the accompanying drawings.

DETAILED DESCRIPTION OF THE INVENTION

Figure 1:
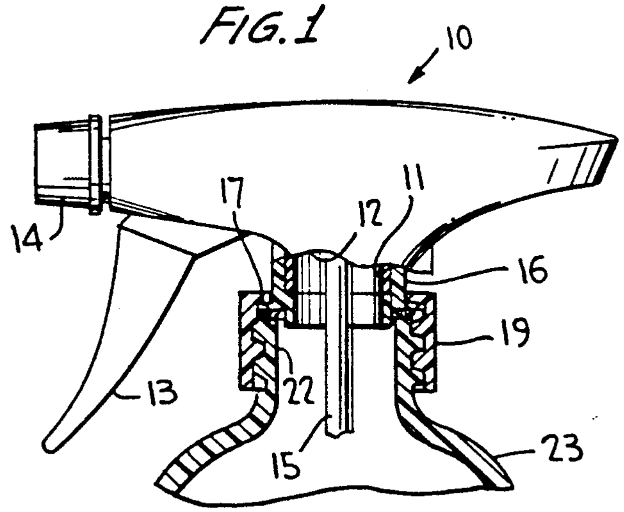
FIG. 1 is a side elevational view, partly in section, of a trigger actuated dispenser which includes a sleeve-like part and which is shown applied to the container after application of the hot melt liner according to the invention.

Turning now to the drawings wherein like reference characters refer to like and corresponding parts throughout the several views, a manually operated dispenser 10, of the trigger actuated type, is shown in FIG. 1 as including a pump body 11, a shroud 12, a trigger actuator 13, a nozzle cap 14, a dip tube 15, etc., as known in this art. The dispenser further includes a sleeve-like element 16 which telescopes over a lower cylindrical portion of body 11 and is force-fitted in place. The inner surface of element 16 may be roughened or may contain annular ribs to enhance the force fit with the lower end portion of the pump body.

Element 16 has an outwardly extending flange 17 in engagement with an inwardly extending flange 18 of an internally threaded closure cap 19.

Upon assembly, element 16 is inserted through the central opening of the cap until flanges 17 and 18 engage, and this sub-assembly is then coupled to the dispenser as element 16 is telescoped about the lower end portion of the pump body.

As known in the art, a separate gasket seal (not shown) is normally installed about the lower end of element 16 in position to overlie the upper rim 21 of threaded container neck 22, and cap 19 is then threaded down onto the container neck as well known in this art. The dip tube extends into the product contained within bottle or container 23, through which product is suctioned into the body 11 upon each suction stroke of the trigger 13, and is dispensed during each compression stroke.

In lieu of a separate gasket, which is not altogether reliable in preventing leakage between the neck rim surface and the dispenser, and which can fall away from the dispenser during shipping, handling or packaging, a hot melt material 24 is applied as a continuous bead along annular surface 25 of sleeve element 16. Thus, before the sub-assembly of element 16 and cap 19 as aforedescribed, element 16 is mounted on a rotatable holding fixture for rotation in the direction of the arrow of FIG. 2 as the hot melt material is applied through a discharge nozzle 26.

Figure 7:
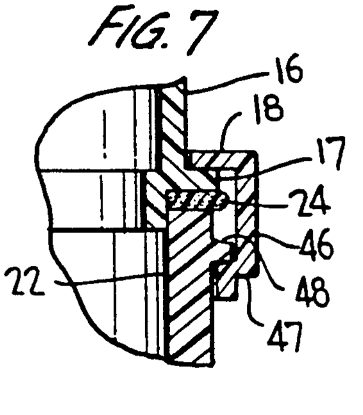
FIG. 7 is a view similar to FIG. 3 showing a non-threading type closure applied to container.
Figure 8:
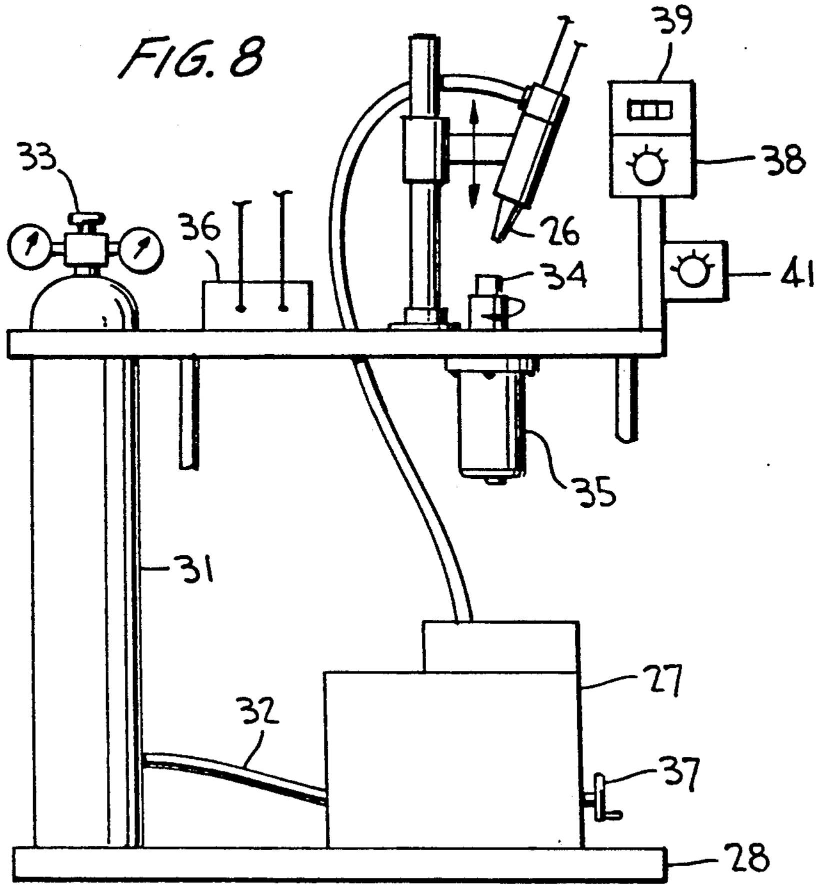
FIG. 8 is a schematic illustration of the machine which may be utilized in applying the bead of hot melt material.
Figure 9:
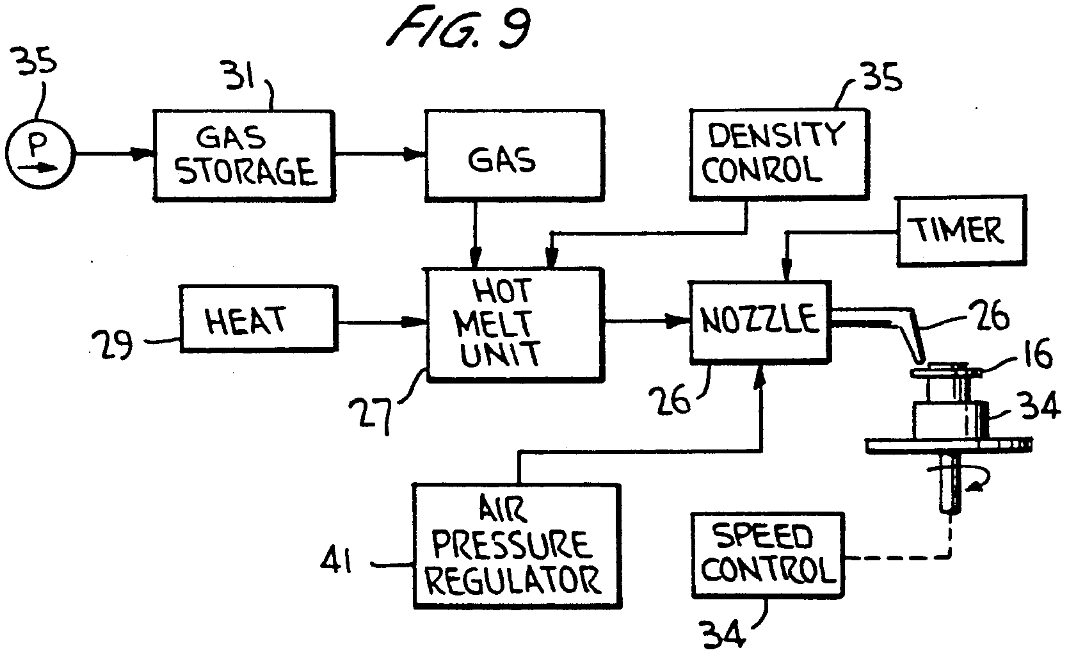
FIG. 9 is a block diagram illustrating the steps carried out in applying the bead of hot melt material in place.

The machine used for this purpose is illustrated in FIG. 7 and in block diagram form in FIG. 8.

A hot melt unit 27 is mounted on a suitable support 28, the unit containing a quantity of hot melt material heated by a suitable heater 29 for maintaining the hot melt material in a molten state.

A pressure tank 31, containing liquid nitrogen, injects nitrogen gas into the molten hot melt material via line 32 as set by pressure control 33 for controlling the amount of pressure at which the gas is allowed to enter the hot melt unit. Nitrogen is chosen because of its reliability in maintaining a given pressure upon expansion as a gaseous fluid. The system is pressurized to maintain the gas in solution until the hot melt is dispensed via nozzle 26 upon which the gas attempts to escape from the molten hot melt material. The gas is trapped in the gasket material as bubbles as the hot melt material cools to room temperature. The density and compressibility of the material can be controlled by the operator depending on the quantity of gas injected. For example, if no gas is injected, the hot melt will remain sufficiently tacky upon cooling so as to adhere to rim surface 21. Otherwise, if the dispenser is to be removed from the container for refilling, a predetermined amount of the gas will be injected to render the hot melt tacky upon cooling but unadhered to rim surface 21. The hot melt, under all conditions, will adhere to surface 25 upon application, and will prevent slippage of the dispenser relative to the container.

Figure 2:
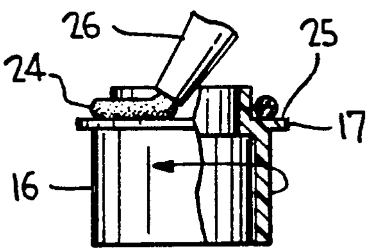
FIG. 2 is a side view, partly in section, of the sleeve-like part of the FIG. 1 dispenser, at a slightly enlarged scale, illustrating the process of applying a bead of hot melt material thereto.

Nozzle 26, extending from the hot melt unit, is mounted for vertical movement as shown relative to a holding fixture 34 on which element 16 is mounted in the position of FIG. 2 with its surface 25 facing upwardly. The fixture is rotated about its central axis by a variable speed motor 35, and a timer control 36 is operatively connected with the nozzle for controlling the interval of time the nozzle will dispense the hot melt material.

The hot melt unit has a density control valve 37 for controlling the amount of nitrogen gas introduced into solution with the hot melt material A fixture speed control 38 regulates variable speed motor 35 to the desired r.p.m. Tachometer 39 indicates the fixture speed in r.p.m., and air pressure regulator 41 controls the nozzle solenoid (not shown) which opens and closes the nozzle needle valve during the hot melt application process.

When applying the annular bead of hot melt material to surface 25 as illustrated in FIG. 2, the material should have strong adhesive bonding characteristics in this molten state so as to adhere to surface 25. Known tackifier resins are therefore included in the hot melt material, and the amount of tack-reducing materials may be balanced against the need for tack in the molten state. Variation of the material and density and tack will be determined by the marketeer requirements. And, by the application cycle, the precise amount of material will be applied to either cause the dispenser 10 to adhere and bind closure cap in place on the container, or to render the hot melt material to function only as a gasket liner, in which case the dispenser can be removed from the container upon unthreading the closure for refilling.

After the hot melt material cools to room temperature, the dispenser may be thread-coupled to the container neck upon threading of the cap 19, whereupon the hot melt material is compressed against rim surface 25 for restricting unthreading (torque back-off) of the cap while remaining unadhered to the rim surface. The compressed hot melt material likewise prevents formation of a leak path between the rim surface and the dispenser. Of course, depending on variation of the material in density and tackiness as mentioned above, the hot melt material may be sufficiently tacky to bind to rim surface 21, depending on specific needs Moreover, upon threading down the closure cap, the hot melt material, depending on the size of the bead, may be caused to extrude into contact with the cap threads to further restrict unthreading of the cap.

Figure 4:
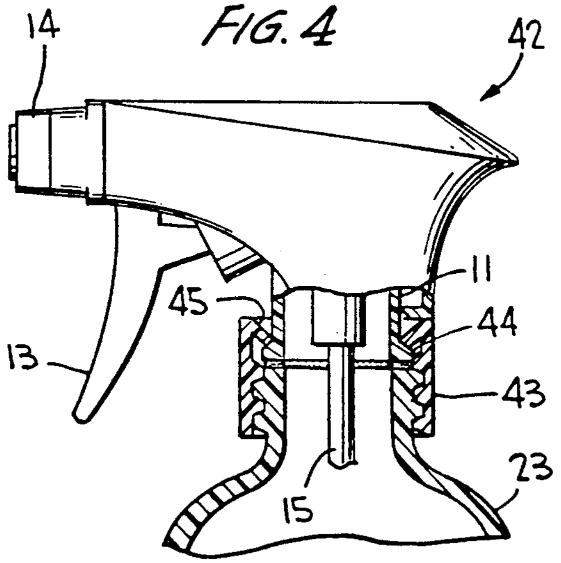
FIG. 4 is a view similar to FIG. 1 of another type trigger actuated dispenser which includes an alternative type closure cap applied to the container.
Figure 5:
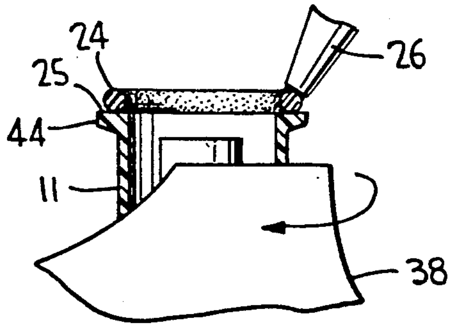
FIG. 5 is a view similar to FIG. 4, at a slightly enlarged scale, illustrating the process of applying the bead of hot melt material to the lower end of the dispenser body.
Figure 6:
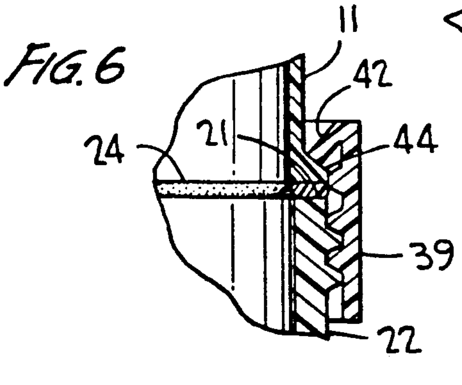
FIG. 6 is a view similar to FIG. 5 showing in detail, at a slightly enlarged scale, the compressed bead of hot melt material.

Another trigger actuated dispenser 42 is shown in FIG. 4, which is structured to be mounted on container 23 utilizing a closure cap 43 similar to that disclosed in U.S. Pat. No. 4,361,256. The lower end of dispenser body 11 has an external annular flange 44, and closure cap 43 has a flexible conical skirt 45 in snap-fitting engagement with the flange for positively retaining the body and the cap together Thus, element 16 is eliminated, and the cap is coupled to an integral portion of the dispenser body itself.

On tightening the closure on the container neck, the flexible conical skirt on the cap deforms to some extent to enhance the tight seal between the body and the container neck, and to improve upon the tight engagement between the cap and the lower portion of the pump body.

If a separate known gasket seal is interposed between the lower end of the dispenser body and the rim surface 21 of the container neck, the tightened closure cap may tend to back-off or loosen during shipment and storage, thereby causing leakage of product from the container.

Figure 3:
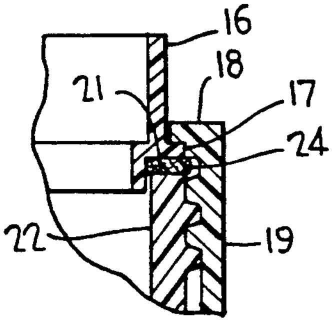
FIG. 3 is a view similar to FIG. 1, at a slightly enlarged scale, showing the details of the hot melt liner of the invention after being compressed upon cooling.

Before cap 43 is snap-fitted in place, the dispenser body is mounted on holding fixture 34 with its surface 25 facing upwardly for application of the molten bead of hot melt material 24 via nozzle 26 in the same manner as aforedescribed. Cap 43 may be then snap-fitted in place, threaded down onto the container neck to compress the hot melt material as in the manner and for the purpose described with reference to FIGS. 1 to 3.

The present invention is not limited to application for use with a thread closure described with reference to FIGS. 1 and 4. For example, a metallic closure cap 46 is shown in FIG. 7 having its flange 18 engaging flange 17 of sleeve 16, the cap being swaged as at 47 around an external annular rib 48 provided on neck 22. The hot melt is compressed upon swaging in the same manner described above for a thread cap. And, the hot melt may extrude into contact with cap 46 to prevent cap movement, as described above.

Obviously, many other modifications and variations of the present invention are made possible in the light of the above teachings. For example, compressed air may be utilized in lieu of pressurized nitrogen, and other manually operated dispensers than those disclosed may incorporate the invention, without departing from the spirit of the present invention. It is therefore to be understood that within the scope of the appended claims the invention may be practiced otherwise than as specifically described

What is claimed is:

1. A method of applying a manually operated dispenser to a container having a central axis and having a neck including a rim surface, the dispenser having an end wall presenting a flat annular surface for overlying the rim surface, and an outwardly extending flange on said end wall, the method comprising the steps of providing a quantity of hot melt, tacky material in a molten state, the material containing a predetermined amount of a pressurized gaseous fluid to form a foamed hot melt material having a predetermined density and compressibility, applying an annular bead of the hot material in the molten state to said flat annular surface of the dispenser for bonding said bead thereto in position to engage said rim surface, said annular bead being applied in a controlled amount and at a controlled rate so as to be deposited as an undeformed beam of material, allowing the hot melt material to cool to room temperature to form an anti-slip gasket seal, providing a separate closure cap having an inwardly extending flange, engaging said inwardly and outwardly extending flanges for coupling said cap to said dispenser while permitting relative rotation of said cap to said dispenser about the central axis of said container, providing cooperating thread means acting between said cap and said container neck, and thread coupling the closure cap to the container neck to compress the cooled and tacky hot melt material against said rim surface such that the tacky hot melt material restricts movement of the dispenser about said central axis while remaining unadhered to said rim surface, so as to avoid unthreading of said cap thereby sealing against leakage from between the rim surface and the dispenser.

2. A method of applying an manually operated dispenser to a container having a central axis and having a neck including a rim surface, the dispenser having an end wall presenting a flat annular surface for overlying the rim surface, and an outwardly extending flange on said end wall, the method comprising the steps of providing a quantity of hot melt, tacky material in a molten state, the material containing a predetermined amount of a pressurized gaseous fluid to form a foamed hot melt material having a predetermined density and compressibility, applying an annular bead of the hot material in the molten state to said flat annular surface of the dispenser for bonding said beam thereto in position to engage said rim surface, said annular beam being applied in a controlled amount and at a controlled rate so as to be deposited as an undeformed beam of material, allowing the hot melt material to cool to room temperature to form an anti-slip gasket seal, providing a separate closure cap having an inwardly extending flange, engaging said inwardly and outwardly extending flanges for coupling said cap to said dispenser while permitting relative rotation of said cap to said dispenser about the central axis of said container, providing cooperating thread means acting between said cap and said container neck, and thread coupling the closure cap to the container neck to compress the cooled hot melt material against said rim surface such that the tacky hot melt material bonds to said rim surface and restricts movement of the dispenser about said central axis, so as to avoid unthreading of said cap thereby preventing formation of a leak path between the rim surface and the dispenser.

3. The method according to claim 1, wherein during said thread coupling, extruding the hot melt material into contact with the cap to restrict cap movement.

* * * * *